United States Patent
Atzmon et al.

(10) Patent No.: US 10,778,869 B2
(45) Date of Patent: Sep. 15, 2020

(54) PRINTING DEVICES

(71) Applicant: HP INDIGO B.V., Amstelveen (NL)

(72) Inventors: Yavin Atzmon, Nes Ziona (IL); Noam Shaham, Nes Ziona (IL); Vladislav Kaploun, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 328 days.

(21) Appl. No.: 15/748,550

(22) PCT Filed: Oct. 30, 2015

(86) PCT No.: PCT/EP2015/075358
§ 371 (c)(1),
(2) Date: Jan. 29, 2018

(87) PCT Pub. No.: WO2017/071783
PCT Pub. Date: May 4, 2017

(65) Prior Publication Data
US 2018/0227461 A1     Aug. 9, 2018

(51) Int. Cl.
*H04N 1/54* (2006.01)
*B41J 2/21* (2006.01)

(52) U.S. Cl.
CPC ............. *H04N 1/54* (2013.01); *B41J 2/2117* (2013.01)

(58) Field of Classification Search
None
See application file for complete search history.

(56) References Cited

U.S. PATENT DOCUMENTS

| 6,552,820 B1 | 4/2003 | Hill |
| 7,717,532 B2 | 5/2010 | Kroon et al. |
| 8,125,688 B2* | 2/2012 | Watanabe ............ H04N 1/6097 358/1.9 |
| 8,721,062 B2 | 5/2014 | Sano |
| 8,919,916 B2 | 12/2014 | Usuda et al. |
| 2006/0250427 A1* | 11/2006 | Kroon .................. B41J 2/17593 347/9 |
| 2013/0215440 A1 | 8/2013 | Chandermohan |
| 2015/0093553 A1 | 4/2015 | Tyagi et al. |
| 2015/0251412 A1 | 9/2015 | Hatanaka |

FOREIGN PATENT DOCUMENTS

| CN | 103813053 | 5/2014 |
| EP | 2104332 | 9/2009 |
| WO | 2015042846 | 4/2015 |

OTHER PUBLICATIONS

International Searching Authority, "Search Report," issued in connection with PCT Patent Application No. PCT/EP2015/075358, dated Jul. 8, 2016, 4 pages.

(Continued)

*Primary Examiner* — Roy Y Yi
(74) *Attorney, Agent, or Firm* — Hanley Flight & Zimmerman LLC

(57) ABSTRACT

Example implementations provide a method of processing data associated with printing a plurality of separations; the method comprising creating, from the data associated with the plurality of separations, complementary separation layer data associated with the complement of data relating to an opaque separation of the plurality of separations.

17 Claims, 10 Drawing Sheets

(56) References Cited

OTHER PUBLICATIONS

International Searching Authority, "Written Opinion," issued in connection with PCT Patent Application No. PCT/EP2015/075358, dated Jul. 8, 2016, 8 pages.

Wiley Online Library, "Inkjet Printing of Narrow Conductive Tracks on Untreated Polymeric Substrates," first published on Dec. 20, 2007, retrieved from the internet [http://onlinelibrary.wiley.com/doi/10.1002/adma.200701876/full] on Sep. 29, 2015, 2 pages.

T.H.J. Van Osch et al., "Inkjet Printing of Narrow Conductive Tracks on Untreated Polymeric Substrates," Advanced Materials 20.2, 2008, retrieved from the internet [http://onlinelibrary.wiley.com/doi/10.1002/adma.200701876/full] on Sep. 29, 2015, 2 pages.

Chinese Patent Office, "Office action," issued in connection with Chinese patent application No. 201580084213.X, dated Apr. 24, 2019, 7 pages. English translation not available.

\* cited by examiner

700

1100

PRINTING DEVICES

Printing, such as, for example, electro-photography printing forms, an image on a substrate by selectively charging or discharging a photoconductive drum with an image to be printed. A colourant is applied to the charged drum and subsequently transferred to the substrate.

Liquid electro-photography (LEP) uses inks as the colourants, as opposed to, for example, toners. An LEP printing device comprises a binary ink developer (BID) that applies a respective ink to a development roller (DR) that, in turn, applies the ink to a Photo Imaging Plate (PIP).

Print quality is a concern within the printing industry. Various colour models and printing techniques can be used to achieve a desired print quality. Double or dual layer printing uses a number of layers of ink to achieve desired optical characteristics such as, for example, intended chroma.

BRIEF DESCRIPTION OF THE DRAWINGS

Various implementations are described, by way of example, with reference to the accompanying drawings, in which.

DETAILED DESCRIPTION

Figure 1:
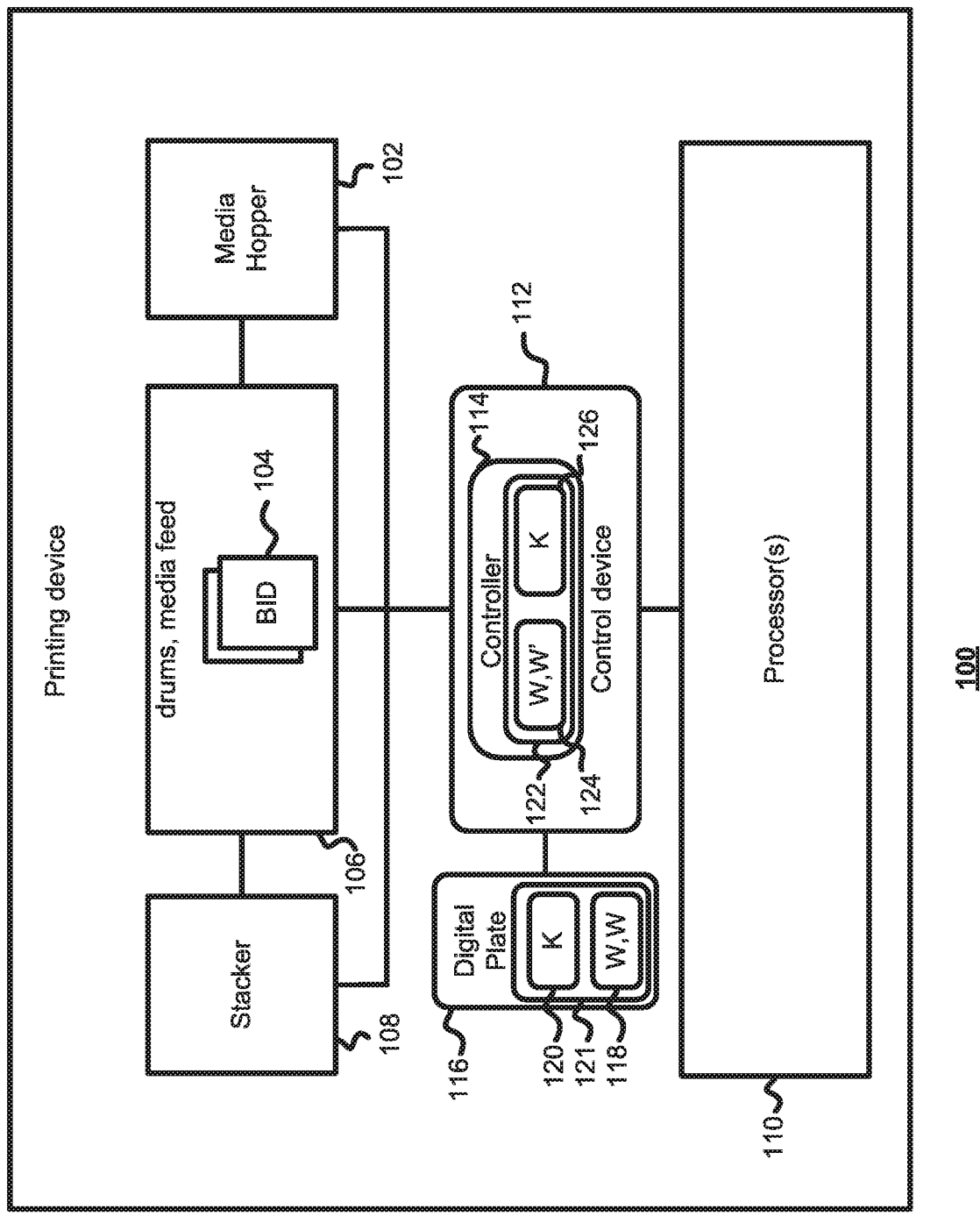
FIG. 1 shows an example implementation of a printing device.

Referring to FIG. 1, there is shown a view of a printing device such as, for example, a liquid electro-photography (LEP) printing device 100, according to an example implementation. The printing device 100 can be, for example, an Indigo printer available from Hewlett Packard Company. Such an Indigo printer is an example of a printing device. The example implementations described within this specification will make reference to LEP printing devices. However, example implementations are not limited to LEP printing devices. Example implementations can be realised using other types of printing devices.

The printing device 100 comprises a hopper 102 for holding print media. A print medium is an example of a substrate in the form of cut-sheets, a web or any other carrier. There are also shown a number of Binary Ink Developers (BIDs) 104. The number of BIDs can vary with the colour system used by the printing device. Therefore, a four colour system will have BIDs corresponding to CMYK, that is, Cyan, Magenta, Yellow and Black. Additionally, a BID corresponding to White can also be provided. This is especially useful for printing on transparent carriers. On such carriers, more than a single layer of white can be printed to achieve a desired optical density. White is merely an example of a reflective separation that can provide a background for one or more than one further separation. Any and all example implementations described in this application can use any reflective separation as a base separation instead of or in additional to White.

The printing device 100 also comprises drums or rollers and media feed mechanisms 106 for effecting printing as well as a stacker 108 for holding printed media. The printing device 100 also comprises processing circuitry 110, which can be in the form of a processor, configured to control the operations of the device. The processing circuitry 110 is arranged to control or realise a control system 112 for influencing printing operations in which the colourants are selectably deposited onto a substrate, that is, for controlling the separations applied to a medium of the media. The processing circuitry 110 is arranged to execute control code 114 for realising the above operations.

The control system 112 is responsive to a digital plate 116 containing data associated with an image to be printed. An example implementation of a digital plate is an electronic file or other data structure comprises data associated with one or more than one separation to be printed. The data relates to the separations used in forming the image. An example implementation of the data is data suitable for printing on a predetermined substrate. In any one or all of the example implementations described in this application, the predetermined substrate can be a transparent or translucent substrate, but need not be such a substrate. Alternatively or additionally, the substrate can be flexible. Alternatively, or additionally, the substrate can be a web, The digital plate 116 comprises base layer data 118 associated with creating multiple layers of a predetermined separation, that is, multiple layers of ink. In the example implementations described in this application, the digital plate 116 comprises data 118 associated with creating a double layer of the predetermined separation. In any one or all of the example implementations, the predetermined separation can be a white separation. The plurality of separations can be used to achieve a predetermined or desired optical characteristic on the resulting printed medium.

The digital plate 116 comprises further data 120 associated with depositing a further predetermined separation, that is, at least one further layer of ink. The data 120 associated with the further predetermined separation can comprise data relating to an opaque ink K. Such an opaque ink can comprise at least one of a Key (or Black) separation and a Metallic, such as, for example, Silver, separation. Although example implementations described in this specification relate to such opaque separations, alternative or additional opaque separations can be used.

The base layer data 118 and further data 120 form part of separation data 121 of the digital plate 116. The separation data 121 can comprise data associated with one or more than one still further separation (not shown) such as, for example, at least one of cyan, yellow and magenta or any other spot or process colour taken jointly and severally in any and all permutations. In any and all embodiments, the data associated with the plurality of separations may or may not comprise data relating to a reflective separation. For example, a digital plate may comprise separation data associated with at least one of a number of separations such as, for example, cyan, magenta, yellow and black, with the reflective separation being specified elsewhere such as, for example, when specifying a desired finish or indicating that desired substrate for which at least one or a number of reflective layers would be desirable. Therefore, data associated with such at least one or a number of reflective layers may or may not form part of the digital plate or colour separation data associated with an image to be printed.

The processing circuitry 110 and control code 114 are arranged to realise a controller for producing a complementary, that is, non-overlapping, print layer data derived from the base layer data 118 and the further data 120 associated with the further separation. The controller is arranged to identify regions of overlap between at least one base layer separation of the base layer separations and the further predetermined separation from their respective base layer data 118 and further separation data 120. In light of one or more than one region of overlap, the controller is configured to produce non-overlapping, that is, complementary, layer data 122 associated with at least one separation of the base layer separations and with the further predetermined separation. In particular, example implementations can produce complementary layer data 122 comprising complementary base layer data 124, W', and, optionally, opaque or Key, K, layer data 126 associated with mutually exclusive or complementary areas on the substrate such that a separation associated with the complementary base layer data 124 does not overlap with a separation associated with the Key layer. The complementary layer data 122, when deposited by the printing device 100, rather than producing a base layer separation bearing an opaque or Key layer separation, that is, multiple layers, instead produces a single layer of mutually exclusive or complementary separations, that is, the base layer separation does not overlap with the under-lying opaque separation.

Example implementations can be realised in which there is a predetermined tolerance or spacing between the composite base layer separation and the Key layer separation defined by their respective data 124 and 126. The predetermined tolerance or spacing can be determined by or associated with one or more than one predetermined characteristic. Examples of such a predetermined characteristic can comprise one or more of dot gain, dot growth, substrate porosity, one or more than one ink or separation viscosity taken jointly and severally in any and all permutations.

The composite layer data 122 can form part of a further digital plate derived from or otherwise associated with an original or initially presented digital plate such as the digital plate 116 described with reference to FIG. 1.

The media held by the hopper can comprise any printable substrate. The substrate can be at least one or more of transparent, flexible, translucent, opaque, cut-sheets or web, cartons, or tiles taken jointly and severally in any and all permutations.

Figure 2:
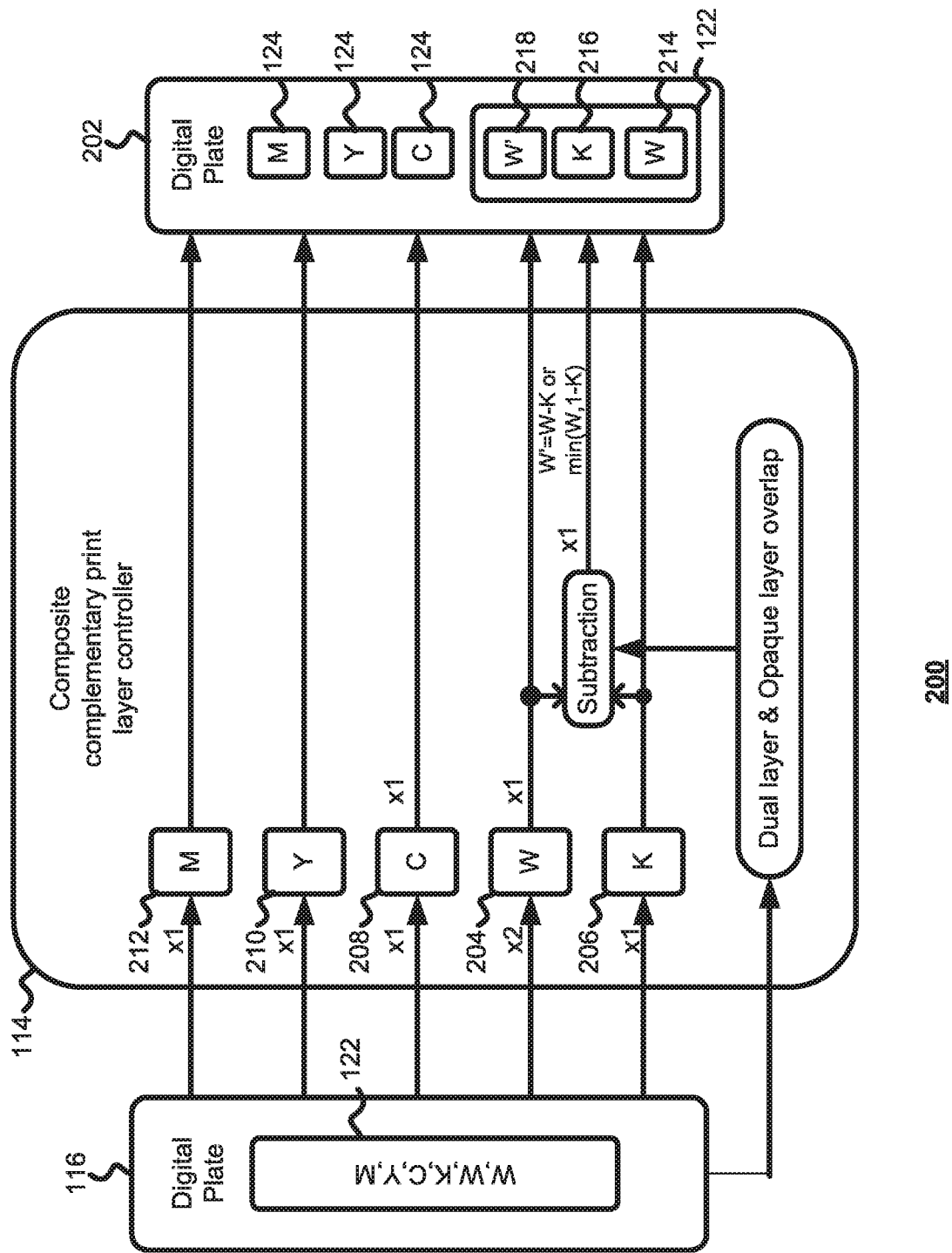
FIG. 2 shows an example implementation of a controller or pre-press tool.

Referring to FIG. 2, there is shown a view 200 of the controller 114 of FIG. 1. The controller 114 receives and processes the digital plate 116 comprising the separation data 121 to produce such complementary base layer data 124 and Key layer data 126. The complementary base layer data 124 and Key layer data 126 can form part of the above composite layer separation data 122. As indicated above, the composite layer separation data 122 may form part of a further digital plate 202. The further digital plate 202 can be a newly created data structure or be a modified version of the original digital plate 116.

The multiplier relates to the number of layers of a given separation to be deposited in the final printed object. For example, two white layers can be deposited, which have associated data 204. The two white layer represent examples of base layer separations such as the above described base layer separation data 118. A single opaque layer is provided, which is presented by corresponding data 206, which corresponding data 206 is an example of the above described Key data 120. Data associated with one or more than one further separation can also be provided. For example, the data can comprise one or more than one of cyan separation data 208, Yellow separation data 210 and Magenta separation data 212 taken jointly and severally in any and all permutations.

The controller 114 processes the base separation layer data 204 to produce single base separation layer data 214, as indicated by the ×1 multiplier. The controller 114 processes the opaque or Key layer data 206 to corresponding Key layer data 216 in the further digital plate 202, such processing can comprise copying or using the opaque layer data to the printer unchanged or copying the opaque layer data to the new or modified digital plate unchanged. The controller processes both the base separation layer data 204 and the opaque or Key layer data 206 to produce complementary base separation layer data 218, W'=min(W,1−K), (1−K) being the complement of the Key layer data 206. The complementary base separation layer data 218 is arranged such that a corresponding separation does not overlap with the opaque or Key layer separation associated with the Key layer data 206. Data associated with any remaining separations such as the cyan data 208, yellow data 210 and magenta data 212 can be copied to the further digital plate 202 without any amendment.

Hitherto, processing the digital plate 116 would have produced a double layer of white, or other reflective separation, on a substrate, followed by a single opaque layer. The opaque layer can be followed by at least one further separation associated with cyan, yellow and magenta. However, the further digital plate produces a single layer of white, followed by the opaque layer. The opaque layer is then followed by a non-overlapping base layer of white, or other reflective separation, that is, followed by a reflective layer that does not overlap with the opaque layer because reflective separation that would, but for the example implementation, have been obscured or otherwise been optically influenced by the opaque layer, is removed and not deposited. Example implementations can be realised in which the subsequent complementary white layer can be followed by at least one further separation such as, for example, one or more than one of cyan, yellow and magenta taken jointly and severally in any and all permutations.

Example implementations are provided that change the order of depositing the separations. The digital plate 116 comprises separation data 122. Example implementations can be realised in which the separation data is ordered, that is, one or more than one separation has an associate deposition order. In the example implementation, a number of separations are shown, in particular, the example provides six separations. The order of depositing the separation is such that the reflective separations, the white separations in the example, are deposited onto a substrate sequentially and in advance of any one or more further separations of the separation data 122. The remaining separations are can be deposited in any order. For example, the opaque separation, K, could be deposited subsequent to the plurality of reflective separations. In the example implementation shown in FIG. 2, the separations are deposited in the order WWKCMY. However, example implementations can change or modify the order of depositing the separations. Therefore, it can be appreciated that the modified digital plate 202 comprises a modified order of separations. In the example implementation, one or more than one reflective layer, W, is intended to be deposited first, followed by an opaque layer, K, that, in turn, can be followed by the modified reflective layer, W'. The foregoing is equally applicable to FIG. 8 and any other example implementation described in this application.

Although the example implementation described with reference to FIG. 1 uses a controller 114 within the printing device 100 to produce the composite layer data 122, example implementations are not limited to such an arrangement. Example implementations can be realised in which an initially presented digital plate such as digital plate 116 is processed by, for example, a pre-press tool to derive or produce the composite layer data 122 or to produce such a further digital plate 202 comprising the composite layer data 122.

Example implementations can be realised in which the controller 114 produces the complementary base separation layer data and all other separation data is merely duplicated in a new digital plate or the newly derived complementary base separation layer data replaces, at least in part, the original base separation layer data in the original digital plate. For example, rather than having data associated with two base separation layers, a resulting digital plate could have data associated with one base separation layer and data associated with a complementary base separation layer that is the complement to one further separation such as, for example, a subsequent opaque separation.

Although the example implementations will use as many BIDs 104 as are appropriate to a colour system used by a printing device. For example, a four colour process, involving yellow, magenta, cyan and black, uses four BIDs. Similarly, a six colour process, such as, for example, Pantone's hexachrome system, would use six BIDs. Suitably, example implementations of printing devices can be realised that use a plurality of BIDs. At least one BID of the plurality of BIDs is operable according to example implementations described herein.

The inks in a subtractive colour system such as a four colour CYMK system can be printed in a prescribed order, that is, the printer can use an ordered colour system to achieve a desired print quality. Therefore, for example, the processing circuitry and executable code 114 can form an example implementation of a composite complementary print layer controller that controls an order of printing the colourants or inks according to an example implementation, which can be, White (W), Key (black), White less Key (W−K), or the minimum between a White layer and White less Key layer, that is, W'=min(W,1−K) as indicated above. The processing circuitry and code 114 can be programmed or otherwise arranged to control the printing to achieve a desired order of printing. Additionally, the processing circuitry and code 114 can be programmed to control the regions or areas in which ink is developed using the above electrostatic charging.

Figure 3:
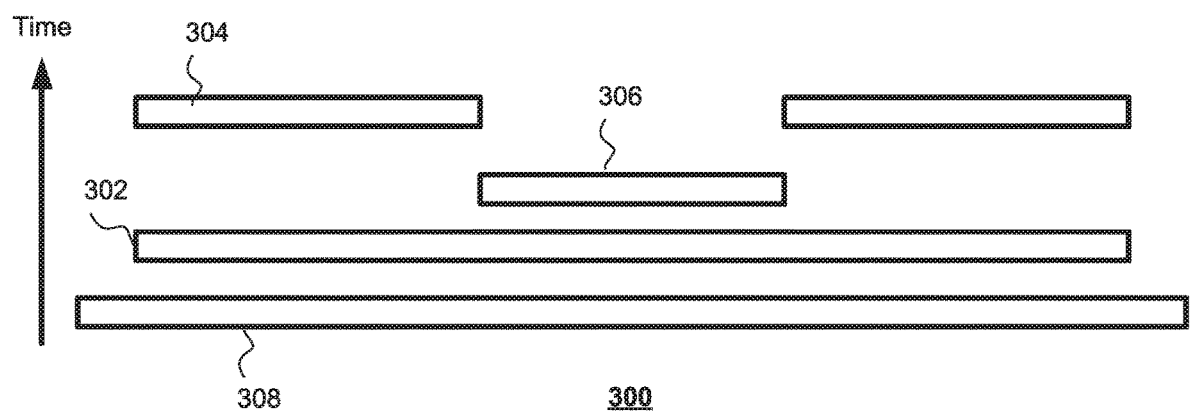
FIG. 3 depicts an example implementation of printing.

Referring to FIG. 3, there is shown a view 300 of an example implementation in which a number of ink separations 302 to 306 have been printed on a substrate 308. In the illustrated example, a base separation layer 302 such as, for example, White layer or other reflective layer, has been deposited first. The base separation layer has been followed by an opaque separation layer 306 such as, for example, a Key layer that is, in turn, followed by a non-overlapping base separation layer 304 that does not overlap with the opaque separation layer 306 such as, for example, a Key layer. The time arrow depicts timing of layer deposition. Both the opaque layer 306 and the complementary base separation layer 304 can be in contact with the previously deposited base separation layer 302. The initial base separation layer 302 can form a common layer or a base layer for the subsequently deposited layers 304 and 306. There is a non-overlapping relationship between the opaque layer 306 and the subsequently deposited complementary base separation layer 304. The complementary base separation layer 304 is the complement to the opaque layer 306 such that they can be described as being in or having a complementary relationship, that is, in a non-overlapping relationship.

In the above example implementation, the complementary base separation layer 304 was deposited subsequent to depositing the opaque or Key layer 306. However, example implementations can be realised in which the order is reversed. For example, a print on a transparent medium or substrate that is designed to be observed from the substrate or medium side. Therefore, example implementations would deposit the non-overlapping separation layer, followed by the opaque layer that, in turn, would be followed by the base separation layer. Similarly, example implementation could use sandwich printing where the same or different prints can be observed from both sides of a transparent substrate or medium which is printed on one side. Hitherto, a separation layer printing order would have been WWKCYM. However, any one or all of the example implementations described in this application can change the order of printing such that an opaque (K) layer is, from a temporal perspective, deposited between base layer separations (WW).

During normal printing, in which the resulting image is viewed from the print side, that is, the side bearing the separations, an original or intended print sequence would be providing the substrate (S), followed by two white separations (WW) and then any further separations such as, for example, cyan, magenta, yellow and black (CMYK) in some order. This can be represented as printing order of SWWCMYK when view from K towards S. However, the example implementations described in this application change the printing order such that the new printing order would be SWKW'CMY, where W' is a manipulated version of the hitherto W separation processed to remove any overlap with the opaque layer K. the manipulated White layer W' can be formed as W'=W−K and/or as W'=min(W, 1−K).

Example implementations can be realised in which the substrate is transparent and intended to be view from the substrate side. Therefore the new printing order would be SCMYW'KW. Again the opaque layer is deposited temporally between the manipulated White layer (W') and an original white layer (W). Still further, example implementations can be realised in which an image is intended to be viewable from both sides of the substrate, which would result in a printing order of CMYW'KWKW'CMY. Each opaque layer K is deposited between respective original white W and manipulated white W' layers. Although the further separations have been described as comprising one or more than one of cyan, magenta, yellow and black (CMYK), some other colour process comprising an opaque layer could be used.

An example implementation provides a method of processing print job data, the method comprising receiving an initial digital plate comprising data associated with a plurality of separations to be deposited in an initial ordered manner on a substrate; the ordered manner comprising a number, such as two, of base separations and at least an opaque separation; and processing the data to establish a modified order of depositing the plurality of separations on the substrate; the modified order comprising depositing at least one base separation of the number of base separations, followed by depositing an opaque separation, followed by another base separation associated with the number of base separations. Additionally, the above example implementation can comprise establishing a new or modified digital plate comprising data associated with the modified order. Alternatively or additionally, example implementations provide such methods creating, from data associated with the opaque separation and data associated with at least one of the base separations, data associated with said another base separation; said another base separation having a non-overlapping relationship with the opaque separation. Example implementations can be provided wherein said creating the data associated with said another separation comprises creating data associated with a modified White separation. The modified White separation can comprise data associated with at least one of (a) W'=W−K, where W' is the data associated with modified White separation, W is data associated with said at least one of the base separations and K is the data associated with the opaque separation; and (b) W'=min(W,1−K), where W' is the data associated with modified White separation, W is data associated with said at least one of the base separations and K is the data associated with the opaque separation and min(.) is a function that returns the minimum of a plurality of arguments. Additionally, or alternatively, such methods of example implementations can be provided wherein the data associated with the plurality of separations comprises data associated with at least two White separations and the data associated with the opaque separation with the initial order of WW followed by K and the modified order comprises WKW'.

Although the example implementations described in this application have been described with reference to producing a complementary base separation layer, examples are not limited to such an arrangement. Example implementations can be realised in which one or more than one other, alternative, or additional, complementary separation layer is produced that is the complement to the opaque layer.

Figure 4:
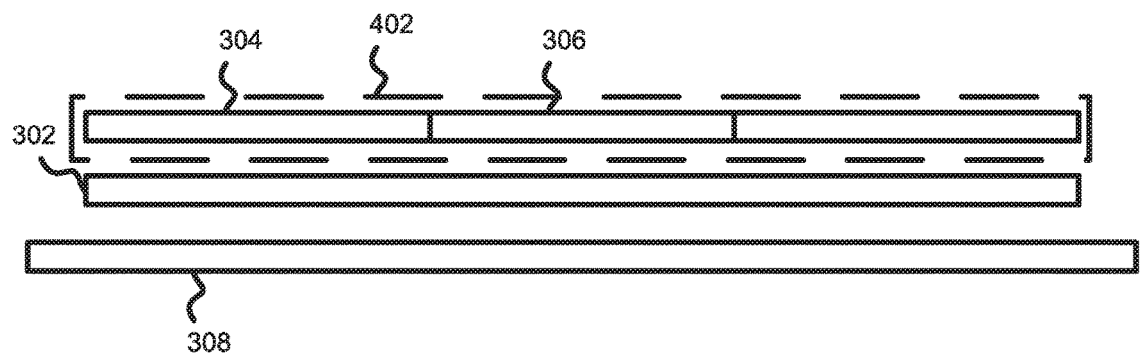
FIG. 4 illustrates a consolidated view of FIG. 3.

Referring to FIG. 4, there is shown a view 400 of the separations or layers 304 and 306 forming a composite layer 402. The composite layer 402 comprises complementary separations 304 and 306, that is, non-overlapping separations.

Figure 5:
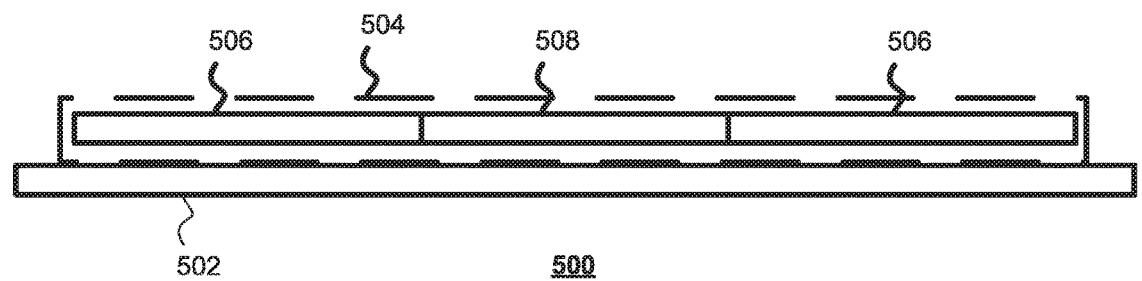
FIG. 5 shows an example implementation of printing.

FIG. 5 shows a view 500 of an example implementation of a carrier, such as a paper sheet or other substrate 502 bearing a composite layer 504 such as the above composite layer 310 without the intermediary of the initial base separation layer 302. Such an example implementation can be realised if, for example, the substrate is a predetermined colour. In example implementations, the predetermined colour for the substrate or carrier can be white. The composite layer comprises non-overlapping regions of a plurality of separations. In the example implementation shown, there are two separations 506 and 508. One of the separations 506 is the complement of the other 508.

Figure 6:
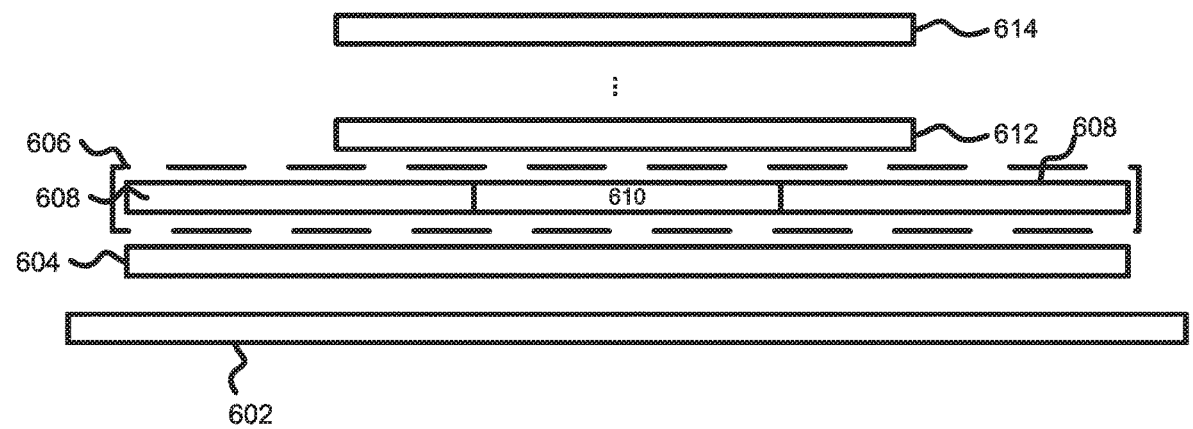
FIG. 6 depicts a further example implementation of printing.

FIG. 6 depicts a view 600 of a further example implementation of a document or other object. The document or other object comprises a carrier 602 bearing a base separation layer 604, that is, a layer of colourant of a respective type of colourant. The respective type of colourant can be White. The base layer 604 is an example of a common layer, that is, a layer that is common to two or more layers of colourants.

A composite layer 606 is formed on the common layer 604. In the example implementation, the composite layer 606 comprises a plurality of separations of different types. Two types of separation 608 and 610 are depicted. The plurality of separations are deposited in a non-overlapping relationship. The separations 608 and 610 can be a White separation and an opaque separation such as, for example, a Key separation, Metallic, such as, for example, Silver separation or other opaque separation.

In the example implementation, at least one or more than one further separation is deposited. The example implementation shows has a plurality of such further separations 612 to 614. The plurality of further separations 612 to 614 can be one or more of any remaining colourants associated with a colour system used by a printing device. In a four colour system, the remaining layers 612 to 614 of separations can comprise one or more of cyan, magenta and yellow.

Figure 7:
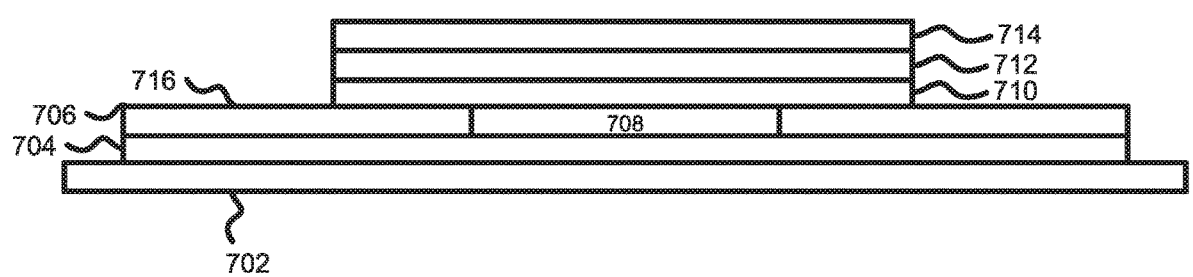
FIG. 7 shows a printed object according to an example implementation.

FIG. 7 shows a view 700 of an object 702 bearing a plurality of separations 704 to 714. The object can be a substrate or carrier such as, for example, a sheet on which an image is to be formed. A first separation has been deposited. The first separation can be a White colourant. A layer is formed on the first separation comprising second 706 and third 708 separations; deposited in any order. The second 706 and third 708 separations can be White and Key. Alternatively, the second 706 and third 708 separations can be Key and White. The second 706 and third 708 separations have a non-overlapping relationship. A fourth 710, fifth 712 and sixth 714 separations are provided. Example implementations can be realised in which the fourth 710, fifth 712 and sixth 714 separations are selected from a group colourants according to a respective colour system. In the case of a four colour process, the fourth 710, fifth 712 and sixth 714 separations are selected from a group colourants comprising cyan, magenta and yellow. The layer comprising the second 706 and third 708 separations is an example of a composite layer 716. The second separation layer 706 is an example of a complementary separation layer that is the complement to an opaque separation layer such as, for example, the third separation.

Figure 8:
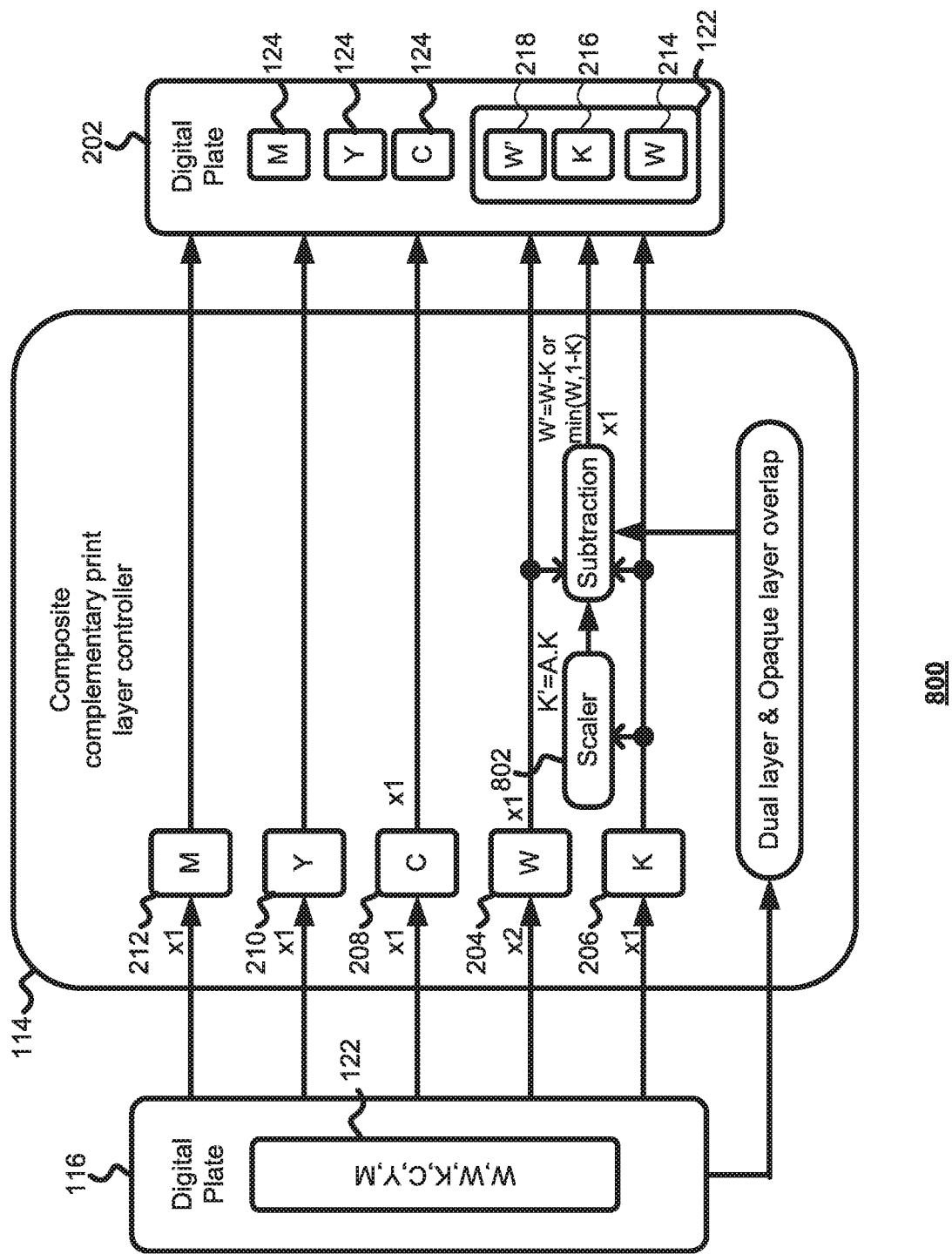
FIG. 8 depicts an example implementation of a controller or pre-press tool.

Referring to FIG. 8, there is shown a view 800 of a further example implementation of the controller 114. The controller 114 is substantially as described above with reference to FIG. 2 but for the additional of a scaler 802. The scaler 802 is arranged to provide a degree of tolerance between an opaque layer, K, and the complementary separation layer, W'. The scaler 802 provides a gap between the complementary separation layer and the corresponding opaque layer. The scaler 802, in the example implementation, enlarges the opaque separation features before subtracting the enlarged opaque layer features from a reflective or white separation The tolerance allows phenomenon such as, for example, dot gain and dot growth to be taken into account when physically depositing or having physically deposited the separations. Therefore, the resulting digital plate will comprise complementary base separation layer data that provides a tolerance about features of an associated opaque layer.

Figure 9:
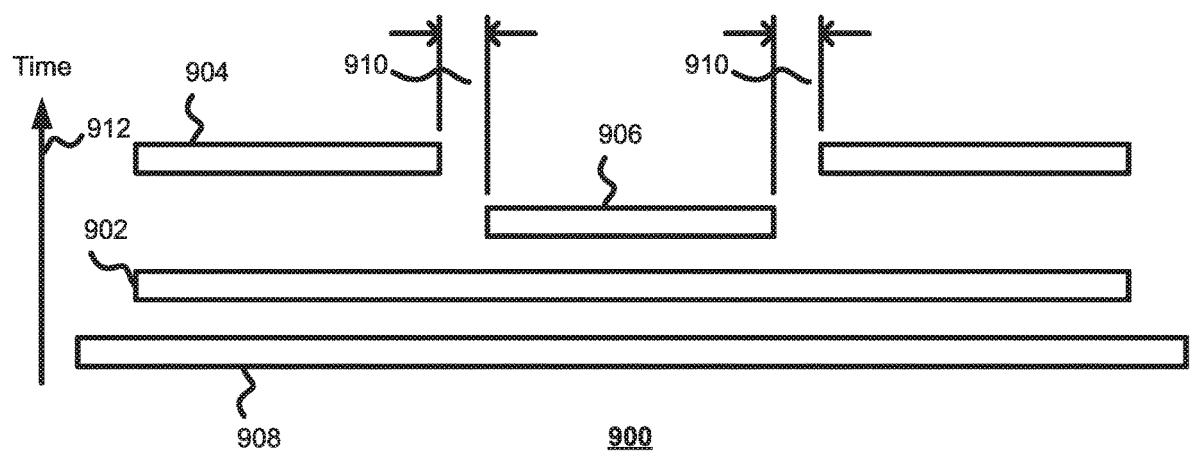
FIG. 9 shows an example implementation of printing.

Referring to FIG. 9, there is shown a view 900 of an example implementation in which a number of ink separations 902 to 906 have been printed on a substrate 908. In the illustrated example, a base separation layer 902 such as, for example, White layer, has been deposited first. The base separation layer has been followed by a complementary base separation layer 904 that is the complement to a subsequent opaque separation layer 906 such as, for example, a Key layer. The time arrow 912 depicts timing of layer deposition. Both the opaque layer 906 and the complementary base separation layer 904 are in contact with the previously deposited base separation layer 902. The initial base separation layer 902 can form a common layer or a base layer for the subsequently deposited layers 904 and 906. There is a non-overlapping relationship between the opaque layer 906 and the complementary base separation layer 904. The complementary base separation layer 904 is the complement to the opaque layer 906 such that they can be described as being in or having a complementary relationship, that is, in a non-overlapping relationship.

The complementary base separation layer 904 and the opaque layer 906 have a gap 910 therebetween that provides a degree of tolerance as described above with reference to the controller 114 depicted in FIG. 8. The scaler 802 is arranged to provide an enlarged complementary region that can accommodate the opaque layer with a predetermined gap between the two.

Although the example implementations described in this application have been described with reference to producing a complementary base separation layer, examples are not limited to such an arrangement. Example implementations can be realised in which one or more than one other, alternative, or additional, complement separation layer is produced that is the complement to the opaque layer.

Figure 10:
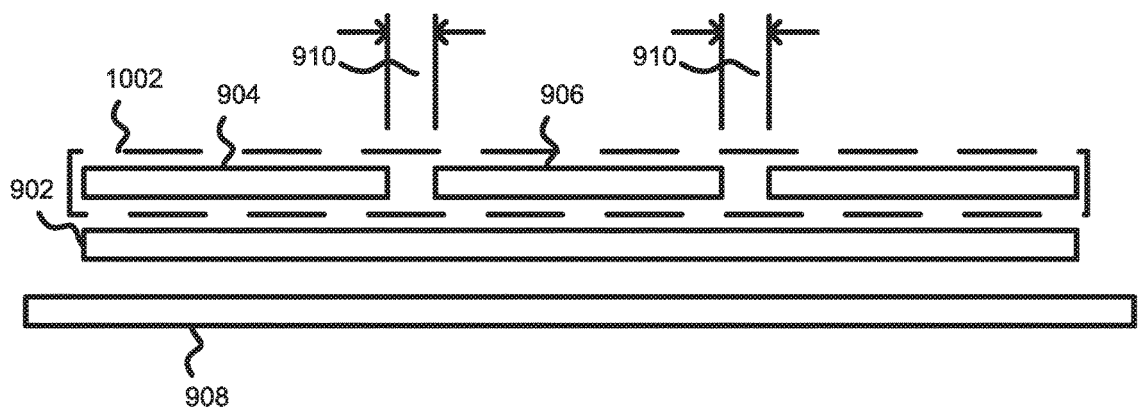
FIG. 10 illustrates a consolidated view of FIG. 9.

Referring to FIG. 10, there is shown a view 1000 of the separations or layers 904 and 906 forming a composite layer 1002. The composite layer 1002 comprises complementary separations 904 and 906, that is, non-overlapping separations.

Figure 11:
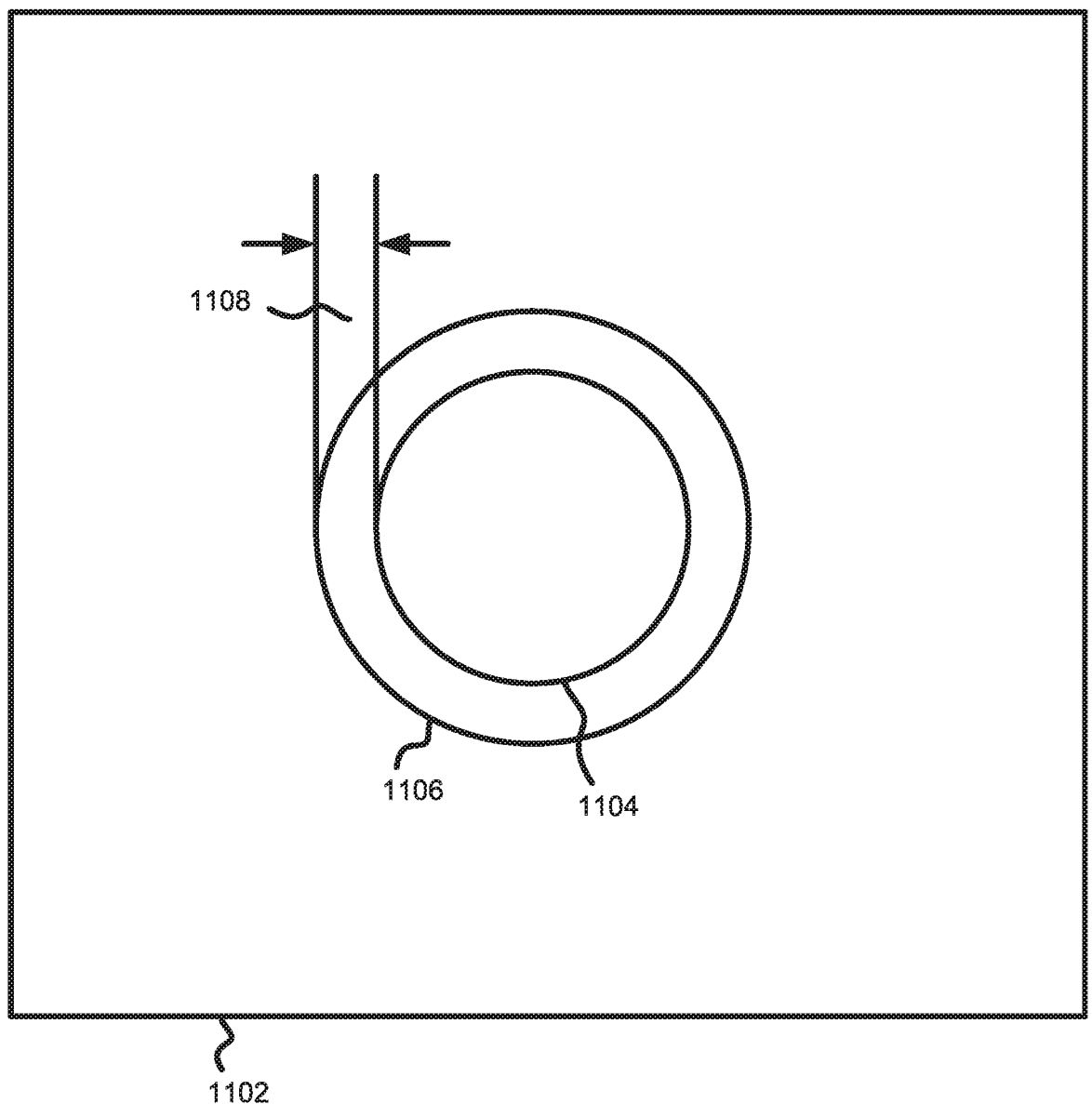
FIG. 11 shows an example of printing according to an implementation.

FIG. 11 shows a view 1100 of a complementary separation layer 1102 that is the complement of an opaque layer 1104. In the example implementation, the opaque layer 1104 comprises a solid circle. Consequently, the complement separation layer 1102 comprises a complementary foramination 1106. The complementary foramination 1106 has been arranged, by the controller shown in and described with reference to FIG. 8, to have introduced a tolerance 1108 between the opaque layer 1104 and the foramination 1106. In the example implementation, the opaque layer 1104 remains at its original size.

Half-tone can be realised using shapes separations of progressively varying sizes. The shapes can be any shape such as, for example, dots, that is, example, circular dots, elliptical dots, square dots Therefore, an example implementation can have an opaque layer, such as layer 1104, comprising a plurality of predetermined shapes such as, for example, circles and a complementary foraminated layer such as, for example, layer 1102, bearing complementary foraminations associated with the opaque layer.

Figure 12:
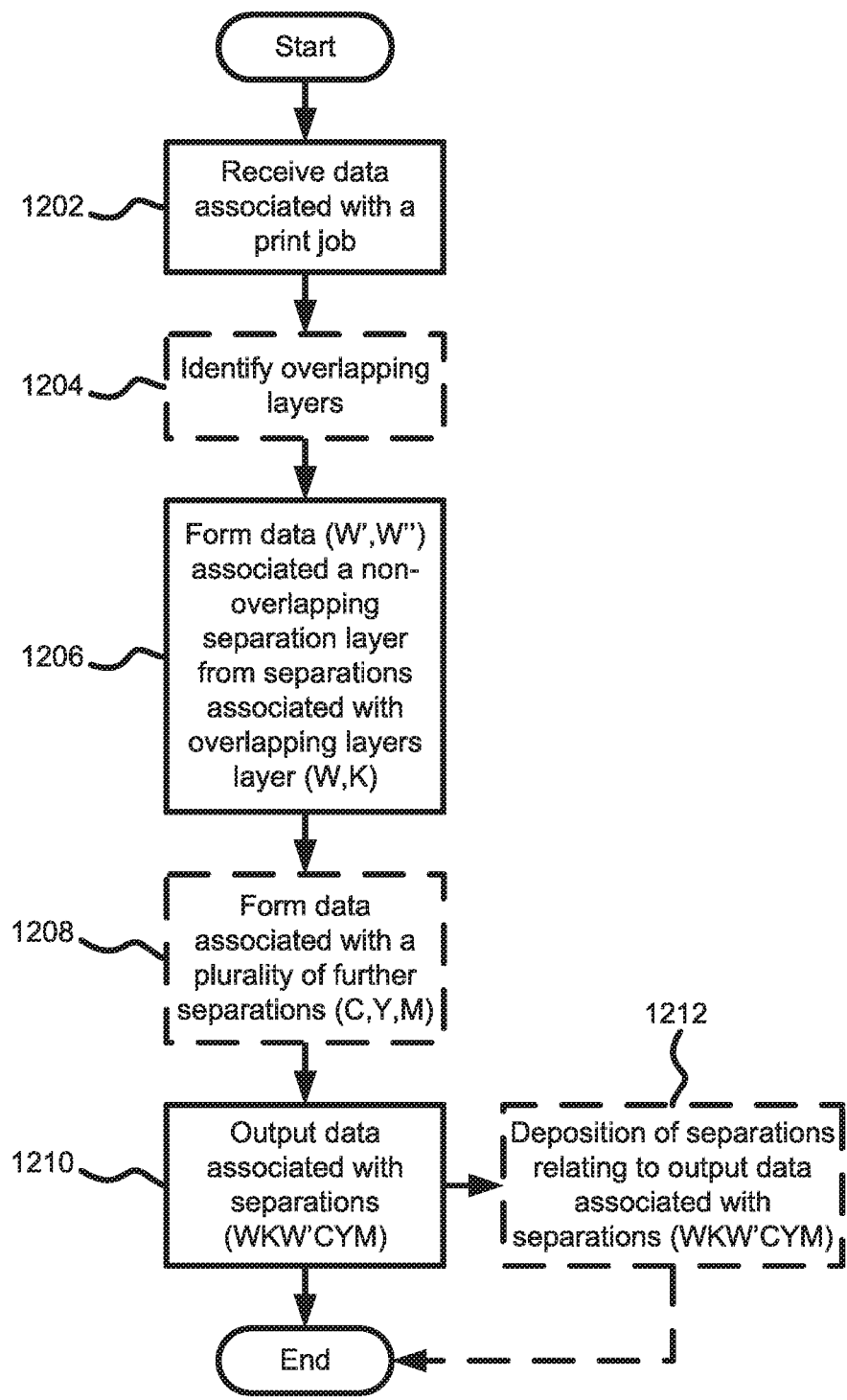
FIG. 12 depicts a flow chart of operations according to an example implementation.

Referring to FIG. 12, there is shown a flowchart 1200 of operations performed according to example implementations. The processing circuitry and code 114 receives, at 1202, data associated with a print job. An example of such data is one or more of the digital plates described in this application. The processing circuitry and code 114 can be arranged to identify, at 1204, regions of potential overlap between a plurality of separations, such as an opaque separation and a base, that is, reflective, separation. Such identification has been shown using dashed lines because in some example implementations, according to the nature of the data supplied, specifically identifying overlapping layers is not be needed since the non-overlapping reflective separation data can be calculated from the opaque layer separation data as indicated below. Example implementations can be realised in which the plurality of separations influence one or more of shade, tint and opacity taken jointly and severally in any and all combinations.

The processing circuitry and code 114 are arranged, at 1206, to form data associated with printing or otherwise depositing the plurality of separations in a complementary separation layer such that there is a non-overlapping relationship between the plurality of separations.

At 1208, data associated with one or more than one further separation can be processed. Such processing can include merely duplicating the data associated with the one or more than one further separation. For example, if the separation data is unaffected by forming complementary separation layer data, processing such unaffected separation data, other than perhaps duplicating it, or merely sending it onwards for subsequent processing or action, such as printing or including it in a further digital plate, would be unnecessary. Alternatively, or additionally, in an image that one uses two separations, there may be no such further separation data to process at 1208.

Example implementations in this application can, however, process just the reflective separations data and the opaque separations data thereby leaving any other separation data, if any, unchanged.

Having formed the complementary separation layer data, the data separations associated with print job, can be output at 1210. Such an output can take the form of a newly created or modified digital plate, or be output by the controller for physically depositing corresponding separations. The data thus formed can, therefore, be used at 1212, to print the physical separations on a substrate.

Example implementations have been described with reference to using digital plates. Example implementations are not limited to digital plates. Example implementation can be realised that use other type of plate or printing technology such as, for example, offset printing, gravure printing and flexo technologies.

Example implementations of the present disclosure can be realised in the form of, or using, hardware, software or a combination of hardware and software. The hardware can comprise at least one of a processor and electronics. The foregoing, that is, the hardware, software or a combination of hardware and software, are examples of circuitry. The circuitry can be configured or arranged to perform a respective purpose such as, for example, implementing any and all of the example implementations described in this specification. Any such software may be stored in the form of executable code on volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. Storage devices and storage media are example implementations of non-transitory machine-readable storage that are suitable for storing a program or programs, that is, executable code, comprising instructions arranged, when executed, realise example implementations described and claimed herein. Accordingly, example implementations provide machine executable code for realising a system, device, method or for orchestrating a method, developer, system or device operation as described in this specification or as claimed in this specification and machine readable storage storing such code. Still further, such programs or code may be conveyed electronically via any medium such as a communication signal carried over a wired or wireless connection and example implementations suitably encompass the same.

Example implementations have been described with reference to a binary ink developer. Example implementations are not limited to a binary ink developer. Example implementations can be realised according to other developers in addition to or as alternatives to binary ink developers.

Any and all of the methods described or claimed in this specification can used to control a printing device comprising a binary ink developer. Therefore, example, implementations provide a controller to implement the methods described in this specification.

Producing a composite layer according to the example implementations described in this specification, can have one or more than one of the following, taken jointly and severally:

(1) colourant consumption can be reduced, especially in double layer printing that can be used in digital and physical printing to realise desired optical properties such as a desired colour Chroma and/or opacity;

(2) drying times can be reduced because the composite layers, hitherto formed from two separations, one deposited on the other, are deposited in an non-overlapping relationship;

(3) printing times can be reduced because hitherto null printing cycles have been used between separations to allow the separations to dry.

Although the example implementations have been described with reference to double layer printing such as, for example, the two layers of White, example implementations can be realised in which the Key separation is deposited on a separation other than White. For example, hitherto, double layer printing could have involved printing a first plurality, or pair, of layers of the same colourant or same separation, followed by printing a Key layer. In contrast, the example implementations deposit a single initial layer of an intended double later followed by a composite layer containing both the second layer of the initial separation and the Key separation.

Example implementations can provide a printing device or controller such as, for example, the devices or controllers shown in or described with reference to any of the figures, in particular, FIGS. 1, 2, 8 and 12. The devices or controllers can comprise a controller, circuitry or processor to implement any method as described or claimed in this application. Similarly, example implementations can provide a controller, circuitry or processor for controlling an ink developer or such a printing device; the controller comprising circuitry or a processor to orchestrate or implement any method as described or claimed herein. Furthermore, any such methods can be realised, at least in part, using machine executable code comprising instructions arranged, when executed by at least one processor, to control or implement any method described or claimed herein. Example, implementations provide non-transitory machine readable storage storing such machine executable code.

In any one or more of the above example implementations, where there is overlap between an opaque layer and an intended underlying white layer, data associated with white separation that would hitherto have been covered by an opaque separation is not deposited.

The example implementations, overlap between a white layer and an opaque layer has be removed, which save depositing white separation that would be obscured by the opaque separation.

Although the example implementations have been described with reference to an opaque layer and removing from a white separation layer any need to deposit white separation that would be obscured or otherwise influenced by the opaque separation, alternative or additional implementations can be realised in which the opaque layer has a prescribed degree of opacity such that the example implementations remove overlap between such an opaque layer of a prescribed degree of opacity and the white layer.

The manipulated white layer, that is, the non-overlapping base separation layer can be realised or visualised as W'=W.AND.(NOT.K), where W represents at least one base separation layer and K represents an opaque layer. Therefore, in processing a digital plate, for example, to produce a printed image or a modified digital plate, the manipulated white layer data, that is, the non-overlapping base separation layer data can be realised or visualised as W'=W.AND.(NOT.K), where W represents at least one base separation layer data and K represents an opaque layer data. This has the effect of preserving base separation layer or base separation layer data while removing any overlap with the opaque separation layer or opaque separation layer data. A binary example of the above is given below

| Base separation layer data, W | 110101111 |
| Opaque separation layer data, K | 000111000 |
| Not K | 111000111 |
| W' = W&NotK | 110000111 |

Therefore, it can be appreciated that all data associated with the previous base separation layer data has been preserved while any overlap with the opaque layer data has been removed.

Figure 13:
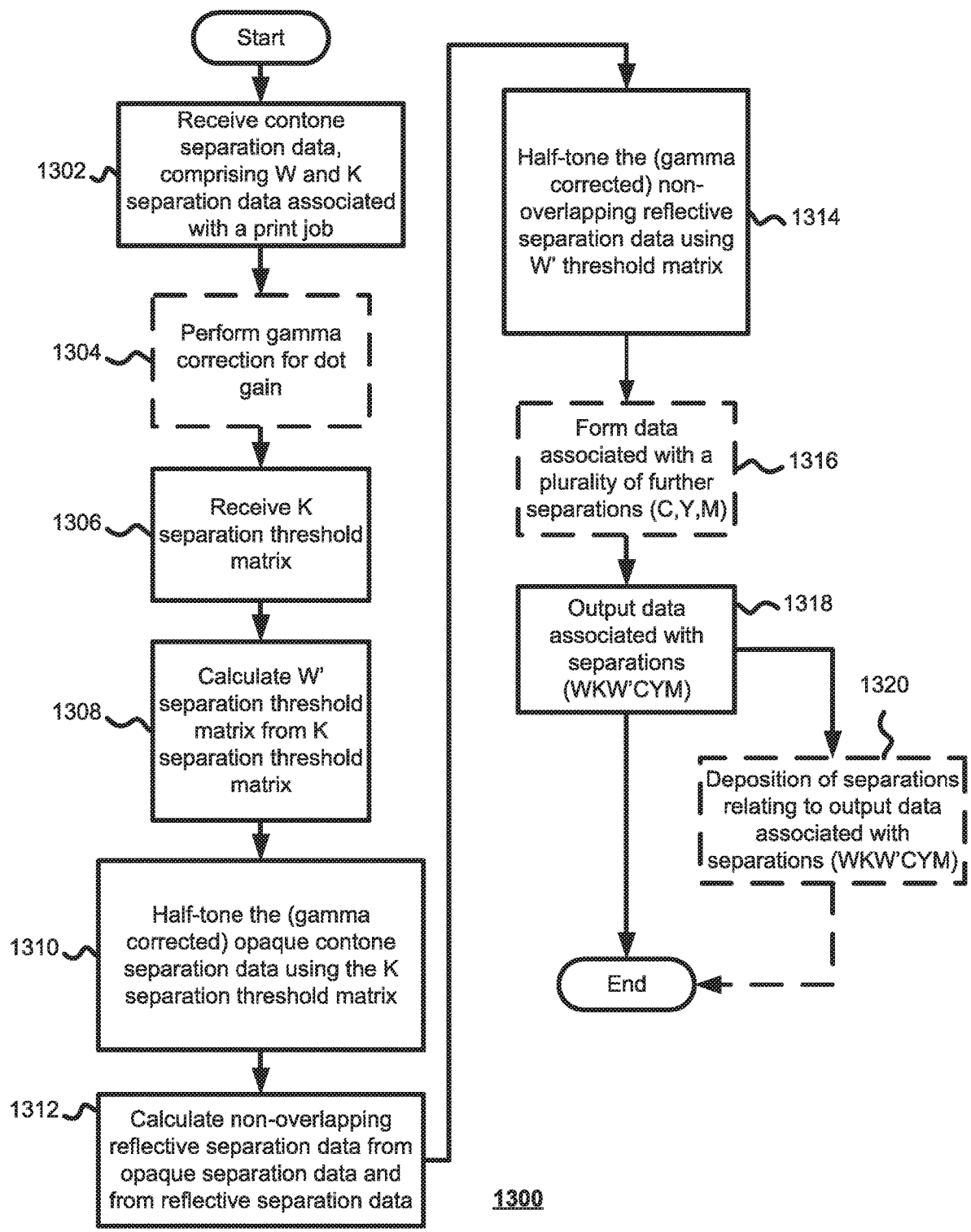
FIG. 13 illustrate a flow chart of operations according to an example implementation.

Referring to FIG. 13, there is shown a flowchart 1300 of operations performed according to an example implementation. The processing circuitry and code 114 receives, at 1302, data associated with a print job. An example of such data is one or more of the digital plates described in this application. The data can comprise continuous tone (contone) data associated with a number of separations such as, for example, a number of reflective separations and at least one opaque separation. The contone data can comprise data relates to other separations according to the colour process used. Therefore, example implementations can provide contone data associated with at least one or more than one of cyan, magenta and yellow separations. The contone data can be expressed as a predetermined number of gray levels such as, for example, 256 gray levels, that is, levels 0 to 255. Example implementations are not limited to such a number of gray levels.

The processing circuitry and code 114 can be arranged, at 1304, to perform gamma correction to compensate for dot gain. The gamma correction can be applied to the contone data for all separations including any reflective separations and opaque separations, as well as to any further separations such as CMY.

At 1306, an opaque threshold matrix is received to be applied to the opaque separation data. In the example implementation, the opaque threshold matrix is an n×n matrix that is applied to n×n groups of pixels in the opaque separation data. Example implementations can be realised that receive threshold matrices for other separations. The threshold matrices are used in half-toning to determine whether or not pixels are "on" or "off", that is, should be printed or not.

At 1308, a corresponding reflective separation threshold matrix is calculated from the opaque threshold matrix. The calculation can use a number of technique such as, for example, $W'_{ij}=255-K_{ij}$, where $K_{ij}$ represents the ($i^{th}$, $j^{th}$) element of the opaque threshold matrix.

The opaque separation data is half-toned at 1310, that is, half-tone opaque separation data is calculated. The half-toning can be conducted in respect of the originally received opaque separation data. Alternatively, if gamma correction has been used, the half-toning is applied to the gamma corrected opaque separation data. If data associated with other separations was received at 1302, such half-toning could also be applied at 1306 to that data of those other separations, or to gamma corrected data associated with those other separations.

At 1312, non-overlapping reflective separation data is determined using W'=255−K or W'=min(W,255−K). Half-toning is applied, at 1314, to the non-overlapping reflective separation data. If gamma correction has been applied, the non-overlapping reflective separation data is calculated at 1312 from such gamma corrected data. Additional gamma correction can also be applied to control the gap tolerance between the complementary separations.

Producing half-tone data from contone data, in the example implementations can use, for example, one or more than one threshold matrix per separation that comprises a plurality of levels used in determining whether or not a pixel in the half-tone separation data is assigned a 1, that is, "on", or a 0, that is, "off", depending whether or not the corresponding contone data is above the respective threshold value in the threshold matrix. The half-tone opaque separation data can be scaled as described above with reference to, for example, FIG. 8.

The processing circuitry and code 114 is arranged, at 1314, to form data associated with printing or otherwise depositing one of the reflective separations using half-tones that do not overlap with the opaque separation, in particular, half-tone opaque separation derived from the opaque contone data. Example implementations can be realised in which the half-tone reflective separation data and the half-tone opaque separation data have a predetermined relationship. Example implementations can be realised in which the predetermined relationship is half-tone (W,255−K)+half-tone(K,K)≤1. The plurality of separations in a complementary separation layer are such that there is a non-overlapping relationship between the plurality of separations.

At 1316, half-tone data associated with one or more than one further separation can be determined using respective threshold matrices.

Having formed the complementary separation layer data, the data separations associated with print job can be output at 1318. Such an output can take the form of a newly created or modified digital plate, or be output by the controller for physically depositing corresponding separations. The data thus formed can, therefore, be used at 1320, to print the physical separations on a substrate.

For example, supposed the opaque separation data threshold matrix received at 1306 is

| 240 | 200 | 150 | 200 | 240 |
|-----|-----|-----|-----|-----|
| 200 | 100 | 040 | 100 | 200 |
| 150 | 040 | 010 | 040 | 150 |
| 200 | 100 | 040 | 100 | 200 |
| 240 | 200 | 150 | 200 | 240 | then the reflective separation data threshold matrix calculated at 1308 is based on W'=255−K, which gives the following reflective separation data threshold matrix:

| 015 | 055 | 105 | 055 | 015 |
|-----|-----|-----|-----|-----|
| 055 | 155 | 215 | 155 | 055 |
| 105 | 215 | 245 | 215 | 105 |
| 055 | 155 | 215 | 155 | 055 |
| 015 | 055 | 105 | 055 | 015 |

An opaque contone gray level of a predetermined value, such as, 220, subjected to the opaque separation data threshold matrix, would give half-tone image data of:

| 01110 |
|-------|
| 11111 |
| 11111 |
| 11111 |
| 01110 |

The contone data below the threshold matrix values are not printed whereas the contone data at or above the threshold matrix values are printed, that is, they are "off" and "on" respectively.

Transformed reflective separation contone data would have a respective threshold level of 255−220=35, that is, 255 minus the opaque contone gray level, which, following that subtraction and applying the reflective separation threshold matrix, would give image data of:

| 10001 |
|-------|
| 00000 |
| 00000 |
| 00000 |
| 10001 | that is, transformed reflective separation contone gray levels of 35 or above are "on", that is, printed, whereas reflective separation contone gray levels of below 35 are "off", that is, not printed. It can be appreciated that the resulting opaque separation data does not overlap with the resulting reflective separation data.

Example implementations provide a method processing data associated with a print job to influence or control at least one of tint or shade in a printed image formed on a substrate using a subtractive colour system; the method comprising creating a composite layer comprising a plurality of separations; the plurality of separations comprising an opaque (Key or Metallic, such as, for example, Silver) separation and a complementary (White) separation; the complementary separation having a non-overlapping relationship with the opaque separation. Such a method can be provided wherein said creating a composite layer comprising a plurality of separations comprises depositing the opaque separation followed by the complementary (W') separation or depositing the complementary (W') separation followed by the opaque (K) separation. The foregoing methods can further comprise depositing a common base layer separation prior to creating the composite layer. Such depositing the common base layer separation prior to creating the composite layer comprises depositing a common base layer separation on the substrate prior to creating the composite layer. Additionally, the methods can comprise depositing one or more than one further separation of the subtractive colour system on the composite layer.

As indicated above, example implementations can provide a carrier or substrate bearing a composite layer comprising a plurality of complementary/non-overlapping ink separations. The composite layer can comprise a plurality of complementary/non-overlapping ink separations comprises a common layer comprising a plurality of separations; the plurality of separations comprising an opaque separation and a reflective separation. Additionally, the layer comprising the plurality of separations can comprise the opaque separation followed by the reflective separation or the reflective separation followed by the opaque separation. The carrier or substrate can comprise a common base layer or reflective separation deposited onto the carrier to host the composite layer comprising the plurality of separations.

Furthermore, the layer comprising the plurality of separations can comprises, on the common base layer or reflective separation layer, the opaque separation deposition followed by, on the common base layer or reflective separation layer, the reflective separation deposition or, on the common base layer or reflective separation layer, the reflective separation deposition followed by, on the common base layer or reflective separation layer, the opaque separation deposition.

Such carriers or substrates can comprise one or more than one further separation depositions of the subtractive colour system on the composite layer.

Example implementations can provide a digital plate as indicated above. Such as a digital plate can be a data structure comprising data associated with printing a plurality of separations (W,K, C,Y,M); the digital plate comprising complementary separation layer data (W'=W−K) or W"=A·W') associated with the complement of data relating to an opaque separation (K) of the plurality of separations. Example implementations can be provided in which the complementary separation layer data (W'=MIN(W,1−K) or W"=A·W') associated with the complement of data relating to an opaque separation (K) of the plurality of separations comprises data (W') associated with at least one or more than one of W'=W−K and W'=min(W,1−K) where W comprises data associated with one separation (White) of the plurality of separations, K comprises data associated with an opaque separation; and min(.) is a function to select the minimum of a plurality of arguments.

Such a digital plate can comprise data for scaling (W"=A·W') the complementary separation layer or a scaled version of the complementary separation layer data according to at least one predetermined characteristic. Any such scaling or scaled data can be arranged to create a predetermined tolerance between the complementary separation layer data and the opaque layer. The predetermined tolerance can be associated with the at least one predetermined characteristic. Example implementations can be provide in which the at least one predetermined characteristic comprises at least one of dot gain and dot growth. A digital plate according to an example implementation can comprise at least the complementary separation layer data (W'=W−K, W"=A·W'). Furthermore, such digital plates can comprising data associated with the plurality of separations (C,Y,M,K).

An indicated above, example implementations can provide a controller comprising processing circuitry to implement any method described in this application. Furthermore, example implementations can provide a printer comprising such a controller.

Example implementations can be realised in the form of hardware, software or a combination of the two. Therefore, example implementations provide non-transitory machine readable storage storing machine executable instructions, arranged, when executed by processing circuitry, to implement any of the methods disclosed in this application.

Particular example implementations find application in printing a plurality of layers of an object; the method comprising forming data associated with printing a composite layer comprising data associated with an opaque separation layer and data associated with a further layer; the data associated with the further layer being influenced by the data associated with the opaque separation layer to remove any overlap between the opaque layer and the further layer; and outputting the data associated with printing the composite layer. Such a further layer can be a reflective layer such as, for example a White layer. Example implementation cab be provided that form data associated with printing a still further layer; and outputting the data associated with the still further layer. Such data associated with the still further layer can comprise data associated with the timing of the printing of the still further layer relative to the plurality of layers to be printed on the object. The data associated with the timing of the printing of the still further layer can comprise data associated with printing the still further layer before printing the composite layer.

Example implementations can provide a method of processing data associated with dual layer printing; the method comprising: processing data associated with a dual-layer of a base separation and a layer of an opaque separation to create complementary separation layer data associated with one base separation layer of the dual layer; the one base separation layer comprising data that is the complement of the opaque separation layer. Such as method can comprise comprising scaling (W"=A·W) the complementary separation layer data according to at least one predetermined characteristic. Scaling the complementary separation layer data can comprise creating a predetermined tolerance between the complementary separation layer data and the opaque layer. The predetermined tolerance can be associated with the at least one predetermined characteristic such as, for example at least one of dot gain and dot growth. Such example implementations can provide creating a digital plate comprising at least the complementary separation layer data (W=W−K, W"=A·W).

The invention claimed is:

1. A method of operating a printer to print a plurality of separations of ink, the method comprising:
   determining, by executing instructions with a processor, a region of overlap between a first layer data of a first layer separation to be printed on a substrate and a second layer data of a second layer separation to be printed on the substrate;
   creating, by executing instructions with a processor and based on the overlap, a third layer data of a third layer separation, the third layer separation including a base layer separation and an opaque separation; and
   causing the printer to deposit, on the substrate, the third layer separation as a single layer of mutually exclusive separations where the base layer separation and the opaque separation do not overlap.

2. The method of claim 1, wherein said creating the third layer data of the third layer separation including determining data (W') associated with at least one or more than one of
   a. W'=W−K, and
   b. W'=min(W,1−K),
      i. where W includes data associated with one separation of the plurality of separations;
      ii. K includes data associated with the opaque separation; and
      iii. min(.) is a function to select the minimum of a plurality of arguments.

3. The method of claim 1, further including scaling, by executing instructions with the processor, the third layer data according to at least one predetermined characteristic.

4. The method of claim 3, in which scaling the third layer data includes creating a predetermined tolerance between the base layer separation and the opaque separation.

5. The method of claim 4, in which the predetermined tolerance is associated with the at least one predetermined characteristic.

6. The method of claim 2, in which the at least one predetermined characteristic includes at least one of dot gain and dot growth.

7. The method of claim 1, further including creating, by executing instructions with the processor, a digital plate including at least the third layer data.

8. A system to print a plurality of separations of ink; the system comprising:
processing circuitry to:
determine a region of overlap between a first layer data of a first layer separation to be printed on a substrate and a second layer data of a second layer separation to be printed on the substrate; and
create, based on the overlap, a third layer data of a third layer separation, the third layer separation including a base layer separation and an opaque separation; and
a printer to deposit the third layer separation as a single layer of mutually exclusive separations where the base layer separation and the opaque separation do not overlap.

9. The system of claim 8, wherein said processing circuitry is to create the third layer data of the third layer separation by determining data (W') associated with at least one or more than one of
 a. $W'=W-K$, and
 b. $W'=\min(W,1-K)$,
  i. where W includes data associated with one separation of the plurality of separations;
  ii. K includes data associated with the opaque separation; and
  iii. min(.) is a function to select the minimum of a plurality of arguments.

10. The system of claim 8, wherein the processing circuitry is to scale the third layer data according to at least one predetermined characteristic.

11. The system of claim 10, wherein said processing circuitry is to scale the third layer data by creating a predetermined tolerance between the base layer separation and the opaque separation.

12. The system of claim 11, in which the predetermined tolerance is associated with the at least one predetermined characteristic.

13. The system of claim 12, in which the at least one predetermined characteristic includes at least one of dot gain and dot growth.

14. The system of claim 8, wherein the processing circuitry is to create a digital plate including at least the third layer data.

15. A carrier or substrate bearing a composite layer comprising:
the first layer separation;
the second layer separation; and
the third layer separation including the base layer separation and the opaque separation deposited as mutually exclusive and non-overlapping separations according to the method of claim 1.

16. The system of claim 8, wherein the printer includes a drum to deposit the third layer separation.

17. The system of claim 16, wherein the printer includes:
a hopper to support the substrate before the drum deposits the third layer separation; and
a stacker to support the substrate after the drum deposits the third layer separation.

* * * * *